United States Patent [19]

Wichorek

[11] Patent Number: 4,706,387
[45] Date of Patent: Nov. 17, 1987

[54] DEVICE FOR MEASURING HOLE ELONGATION IN A BOLTED JOINT

[75] Inventor: Gregory R. Wichorek, Newport News, Va.

[73] Assignee: The United States of America as represented by the Administrator of the National Aeronautics and Space Administration, Washington, D.C.

[21] Appl. No.: 10,950

[22] Filed: Feb. 5, 1987

[51] Int. Cl.⁴ ............................................. G01B 5/30
[52] U.S. Cl. .................................... 33/147 D; 73/834
[58] Field of Search ............ 33/147 R, 147 D, 143 L, 33/148 D; 73/834, 835, 799, 856, 826

[56] References Cited

U.S. PATENT DOCUMENTS

| | | |
|---|---|---|
| 2,494,579 | 1/1950 | Pimlott et al. |
| 4,138,821 | 2/1979 | Wilks |
| 4,527,335 | 7/1985 | Meline |
| 4,537,082 | 8/1985 | Meline et al. |

*Primary Examiner*—Harry N. Haroian
*Attorney, Agent, or Firm*—George F. Helfrich; John R. Manning

[57] ABSTRACT

A device to determine the operable failure mode of mechanically fastened lightweight composite joints by measuring the hole elongation of a bolted joint is disclosed. The double-lap joint test apparatus 10 comprises a stud 20, a test specimen 30 having a hole, two load transfer plates 31, and linear displacement measuring instruments 27. The test specimen 30 having a hole is sandwiched between two load transfer plates 31 and clamped together with the stud 20. Spacer washers 22 are placed between the test specimen 30 and each load transfer plate 31 to provide a known, controllable area for the determination of clamping forces around the hole of the test specimen 30 attributable to bolt torque. The spacer washers 22 also provide a gap for the mounting of reference angles 23 on each side of the test specimen 30. Under tensile loading, elongation of the hole of test specimen 30 causes the stud 20 to move away from the reference angles 23. This displacement is measured by the voltage output of two linear displacement measuring instruments 27 that are attached to the stud 20 and remain in contact with the reference angles 23 throughout the tensile loading. The present invention obviates previous problems in obtaining specimen deformation measurements by mounting the reference angles 23 to the test specimen 30 and the linear displacement measuring instruments 27 to the stud.

4 Claims, 2 Drawing Figures

DEVICE FOR MEASURING HOLE ELONGATION IN A BOLTED JOINT

ORIGIN OF THE INVENTION

The invention described herein was made by an employee of the United States Government and may be manufactured and used by or for the Government for governmental purposes without the payment of any royalties thereon or therefor.

TECHNICAL FIELD OF THE INVENTION

The present invention relates to a double-lap joint test apparatus for measuring the hole elongation of a bolted joint, and more particularly to equipment designed to determine the operable failure mode of mechanically fastened lightweight composite joints by subjecting a test specimen having a hole to a tensile loading and measuring the resulting hole elongation.

BACKGROUND OF THE INVENTION

Verifications of analytical and strength prediction methods for bolted composite joints are generally based on experimentally obtained data from double-lap joint specimens. The joint or test material having a hole is sandwiched between two load transfer or clevis plates which are clamped together with a through bolt. Joint failure modes and failure stresses in net tension, bearing, and shearout are obtained with varying joint geometry.

The most important joint parameters are the ratios of test specimen width/test specimen hole diameter, distance from the center of test specimen hole to edge of test specimen/test specimen hole diameter, and test specimen thickness/test specimen hole diameter. The clamping force applied to the joint by applying torque to the bolt is also important. Joint load carrying capability and failure mode are determined from load-displacement curve(s) and visual inspection of the test specimen hole. Joint displacement is measured with displacement transducers or other extensometer devices attached to the joint near the bolted hole. In mechanically fastened joints the stresses are at a maximum at the fastener hole.

The ability to accurately measure hole elongation without affecting the joint parameters would provide a better understanding of the elastic and plastic behavior of the joint material leading to failure. Determining the operable failure mechanisms in mechanically fastened joints is needed for the design of more efficient, lightweight composite joints.

Various techniques have been employed to experimentally measure hole elongation at a mechanically fastened composite joint. The double-lap test joint is the generally used method to obtain experimental data to support the validity of analytical models which predict stress levels and failure modes of a loaded hole. For a double-lap test joint, a displacement device or reference attachment is mounted to the outer load transfer plates and another reference attachment is mounted to the joint or test material. By mounting one reference attachment to the load transfer plates, the measured displacement is a combination of deformations in the test material and deformations in the load transfer plates. Thus, an accurate determination of the deformations occurring in the test material is dependent on the accuracy of the prediction and calculation of stresses and deformations in the load transfer plates.

Accordingly, it is an object of the present invention to provide a device which will subject a test specimen having a hole to a tensile loading and measure the resulting hole elongation.

A further object is to provide a device which will determine the operable failure mode of mechanically fastened lightweight composite joints by measuring the hole elongation of a bolted joint.

It is another object of the invention to provide a device which will obviate long standing problems in obtaining specimen deformation measurements.

SUMMARY OF THE INVENTION

According to the present invention, the foregoing and additional objects are achieved by providing an apparatus which operates as follows: A test specimen having a hole is sandwiched between two load transfer plates and clamped together with a stud. Spacer washers are placed between the test specimen and each load transfer plate to provide a known, controllable area for the determination of clamping forces around the test specimen hole attributable to bolt torque. The spacer washers also provide a gap for the mounting of reference angles on each side of the test specimen. Under tensile loading, elongation of the test specimen hole causes the stud to move away from the reference angles. This displacement is measured by the voltage output of two linear variable differential transformers (LVDTs) that are attached to the stud and remain in contact with the reference angles throughout the tensile loading. Furthermore, the present invention obviates longstanding problems in obtaining specimen deformation measurements by mounting the reference angles to the test specimen and the measuring devices to the stud.

DETAILED DESCRIPTION OF THE PREFERRED EMODIMENTS

Figure 1:
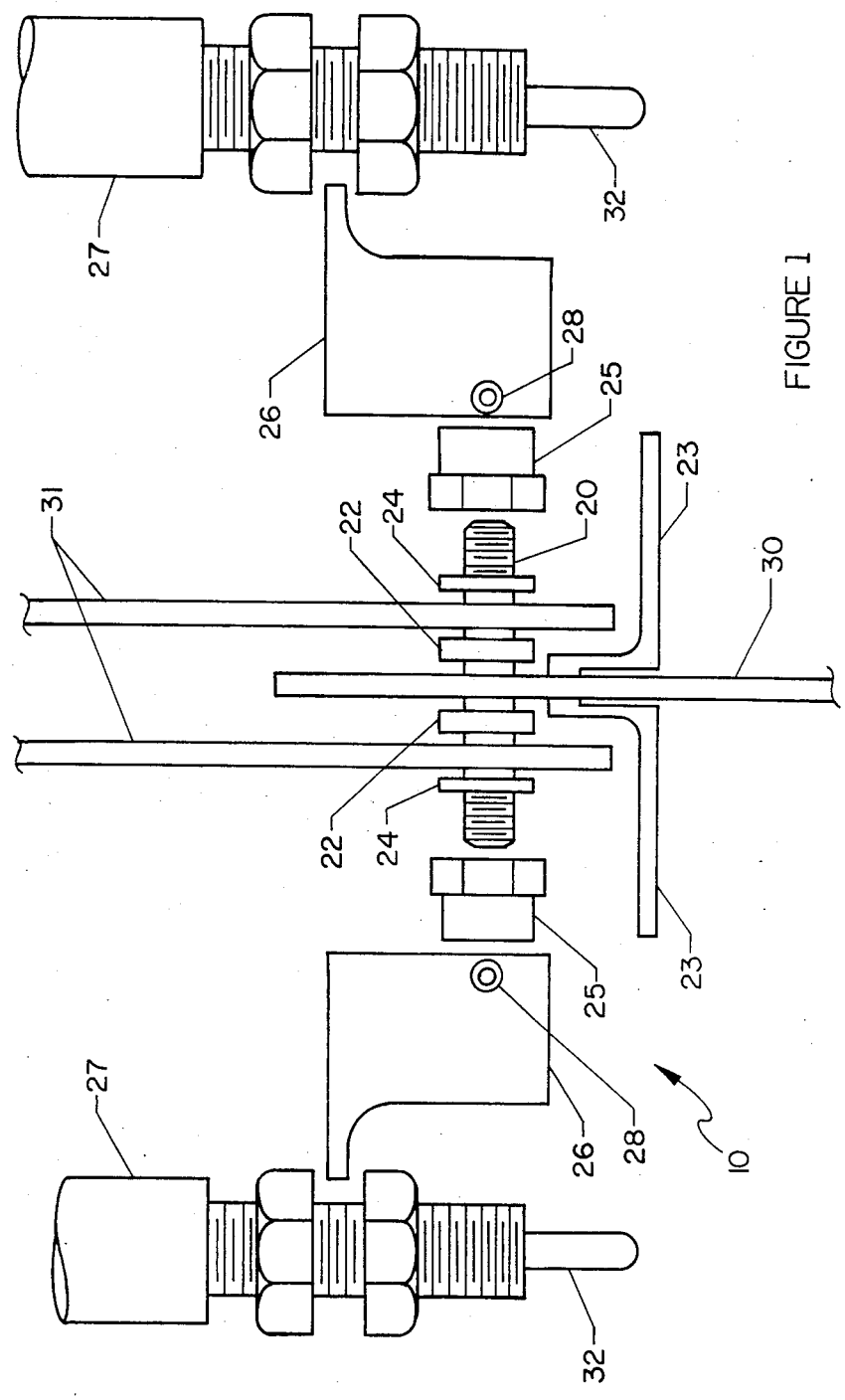
FIG. 1 is an exploded view of the double-lap joint test apparatus for measuring hole elongation in accordance with the present invention.

Referring to FIG. 1, a double-lap joint test apparatus according to the present invention and indicated generally by the reference numeral 10, comprises a stud 20, a test specimen 30 having a hole, two load transfer plates 31, and linear displacement measuring instruments 27. LAR 13453-1 -4- PATEN The stud 20, having the desired bolt diameter, proper thread engagement, and appropriate length so that no threads are in bearing, passes through corresponding aligned holes in the load transfer plates 31 and the test specimen 30 that is sandwiched between the load transfer plates 31 to connect the linear displacement measuring instruments 27. Spacer washers 22 are placed on both sides of the test specimen 30 to provide a gap between the test specimen 30 and the load transfer plates 31 for the mounting of reference angles 23 on either side of the test specimen 30. In addition, the spacer washers 22 provide a known, controllable, and uniform area for the determination of clamping forces around the hole in the test specimen 30 attributed to bolt torque. The reference angles 23 are bonded perpendicularly to the test specimen 30 just below the spacer washers 22. A gap is provided between the test specimen 30 and adjacent legs of the reference angles 23 to prevent deformations in the test specimen 30 below the bonded area from affecting the position of the reference angles 23. Shim washers 24 are used on either side of the load transfer plates 31 to provide a means of testing test specimens 30 of varying thickness with a given length of stud 20. One or more shim washers 24 of the same or different thicknesses could accommodate a range of thicknesses of test specimen 30.

A cylindrical head nut 25 is threaded on each side of the stud 20. One cylindrical head nut 25 is drilled and tapped through, while the other cylindrical head nut 25 is bottom tapped to facilitate applying torque to the test joint, as well as insuring the required thread engagement is achieved at both ends of the stud 20. At the hexagonal end of the nut 25, the hole is counterbored to a depth of three threads for thread relief. The hexagonal shape is machined to standard hex nut dimensions. The diameter of the cylindrical section is machined to close tolerances to achieve a snug fit in a corresponding hole in the instrument holder 26. A hole is drilled and tapped through the sides of the instrument holder 26 perpendicularly to the hole for the nut. Two screws 28, one in each side of the instrument holder 26, are used to lock the instrument holder to the cylindrical section of the nut 25. A close tolerance hole is drilled through the top and bottom of the instrument holder 26 to accommodate the displacement measuring instrument 27, a linear variable differential transformer (LVDT). The centerline axis of the hole of the displacement measuring instrument 27 is perpendicular to the centerline axis of the hole of nut 25, and both axes are in the same plane. Two lock nuts on the threaded portion of the displacement measuring instrument 27 are used to position and lock the displacement measuring instrument 27 to the instrument holder 26.

Figure 2:
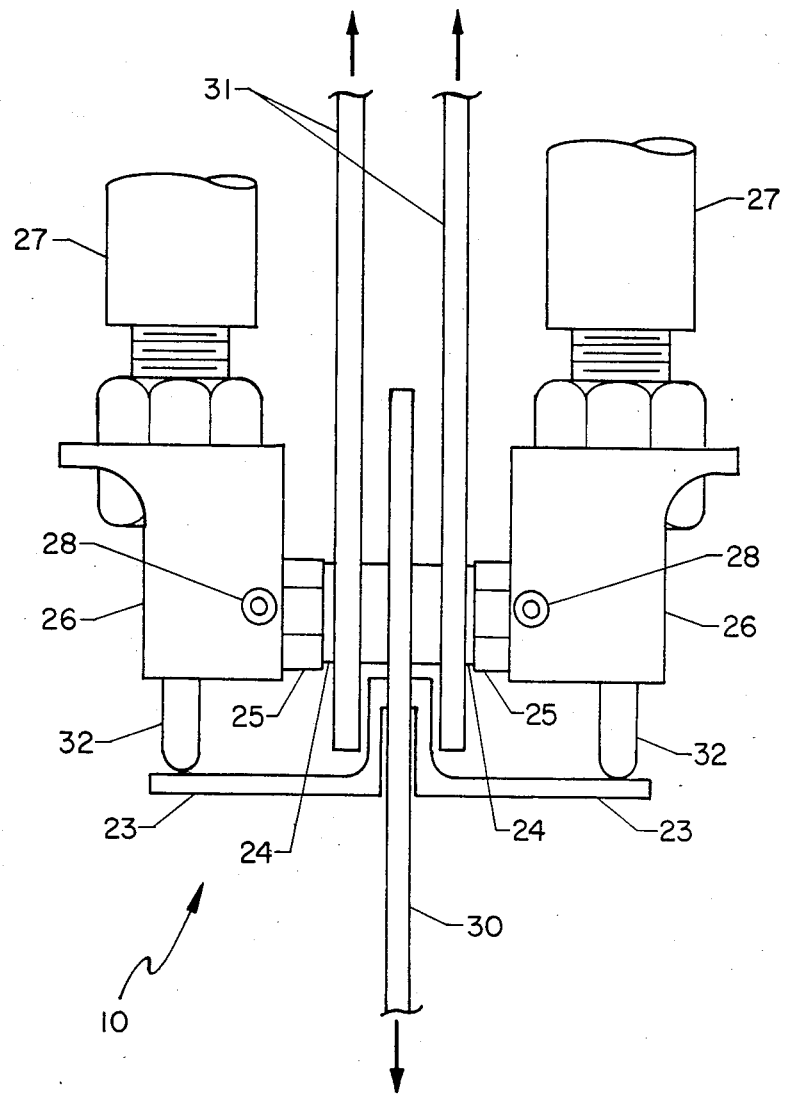
FIG. 2 is an assembled view of the double-lap joint test apparatus according to the present invention.

Referring to FIG. 2, the bodies of the displacement measuring instruments 27 are rigidly attached to the stud 20. The movable cores 32 of the displacement measuring instruments 27 are in contact with the reference angles 23 which are securely bonded to the test specimen 30 below the spacer washers 22. The center of the reference angle 23 area bonded to the test specimen 30 is one reference point and the top of the stud 20 in contact with the hole of the test specimen 30 is the other reference point. Under tensile loading, as the hole of the test specimen 30 elongates due to the stress concentrations around the hole, the distance between the stud 20 and the reference angle 23 increases. The cores 32 of the displacement measuring instruments 27 move with the reference angles 23, and the change in distance between the two reference points is reflected in the output voltages of each of the displacement measuring instruments 27. With increasing load, displacements due to bending and bearing stresses within the stud 20 will occur and be measured along with the hole elongations of the test specimen 30. However, the displacements in the stud 20 are negligible in many cases when a high-strength hardened steel stud 20 is employed. Where displacements in the stud 20 must be taken into account, their magnitude, if elastic in nature, can be analytically determined and subtracted from the measured displacements, leaving only the hole elongations of the test specimen 30.

The present device offers a direct comparison between the displacements occurring at each outer hole surface of the test specimen 30, since the displacement measuring instruments 27 are positioned equidistant from the surfaces of test specimen 30, and the reference angles 23 are mounted opposite each other. Within the elastic limit of the material of the test specimen, specimen bending or unequal loading through the load transfer plates 31 can be detected by comparing the displacement versus load responses.

The present device is operable with different diameters of stud 20, different sizes of washer 22, changed bolt torque, and test specimen 30 materials. Also, the device is operable with some multi-fastener arrangements. In addition, the joint strength and failure mode may be studied for some other types of mechanical fasteners with a suitable design of stud 20.

While the present invention has been described with reference to particular embodiments thereof, it will be understood, of course, that certain changes, modifications and substitutions will be apparent to those skilled in the art without departing from the spirit and scope of the claims.

What is claimed as new and desired to be secured by Letters Patent of the United States is:

1. A device for measuring hole elongation in a test specimen comprising:
    reference angles fixed to said test specimen;
    two load transfer plates, each having a hole corresponding to the test specimen hole and positioned in alignment with the test specimen hole;
    two spacer washers placed between the test specimen and each load transfer plate;
    a means for connecting said test specimen, said spacer washers, and said load transfer plates which passes through the load transfer plate holes, the spacer washers, and the test specimen hole to form a load transfer plate/spacer washer/test specimen/spacer washer/load transfer plate sandwich;
    two cylindrical head nuts positioned on both ends of said means for connecting said test specimen, said spacer washers, and said load transfer plates;
    a means for measuring linear displacement of said reference angles;
    a means for connecting said means for measuring linear displacement of said reference angles to said cylindrical head nuts positioned on both ends of said means for connecting said test specimen, said spacer washers, and said load transfer plates, so that said means for measuring linear displacement of said reference angles remains in contact with said reference angles;
    the centerline of said means for measuring linear displacement being parallel to the axes of said test specimen and said load transfer plates and perpendicular to the centerline of said means for connecting said test specimen, said spacer washers, and said load transfer plates, all centerline axes being in the same plane.

2. The device of claim 1 wherein the means for connecting said test specimen, said spacer washers, and said load transfer plates is a stud.

3. The device of claim 2 wherein the means for connecting said test specimen, said spacer washers, and said load transfer plates is a high-strength hardened steel stud.

4. The device of claim 1 wherein the means for measuring linear displacement of said reference angles is a linear variable differential transformer (LVDT).

* * * * *